UNITED STATES PATENT OFFICE.

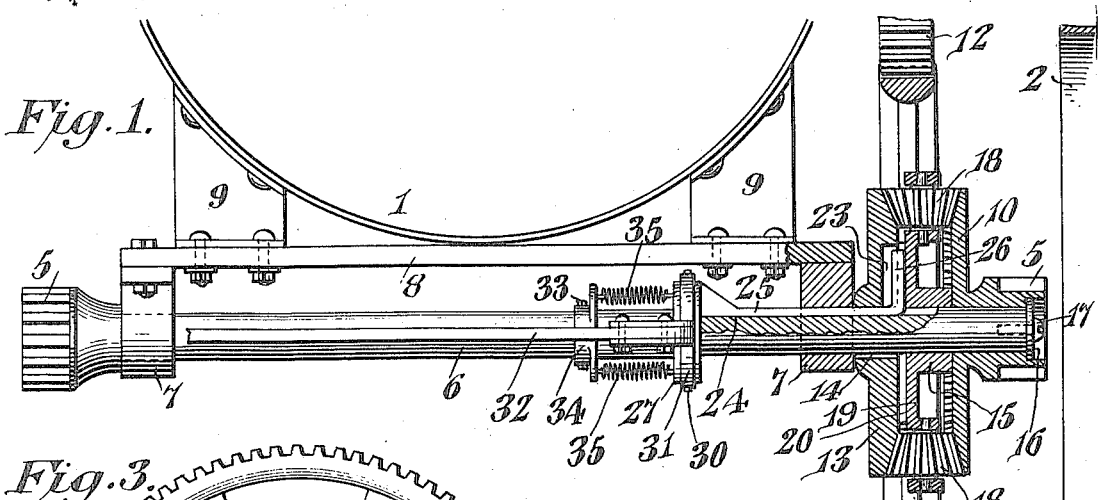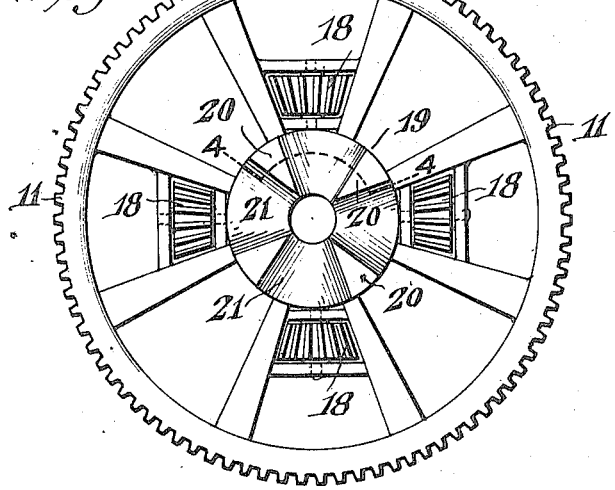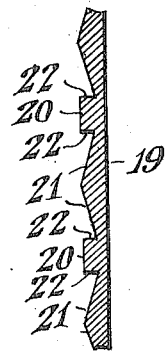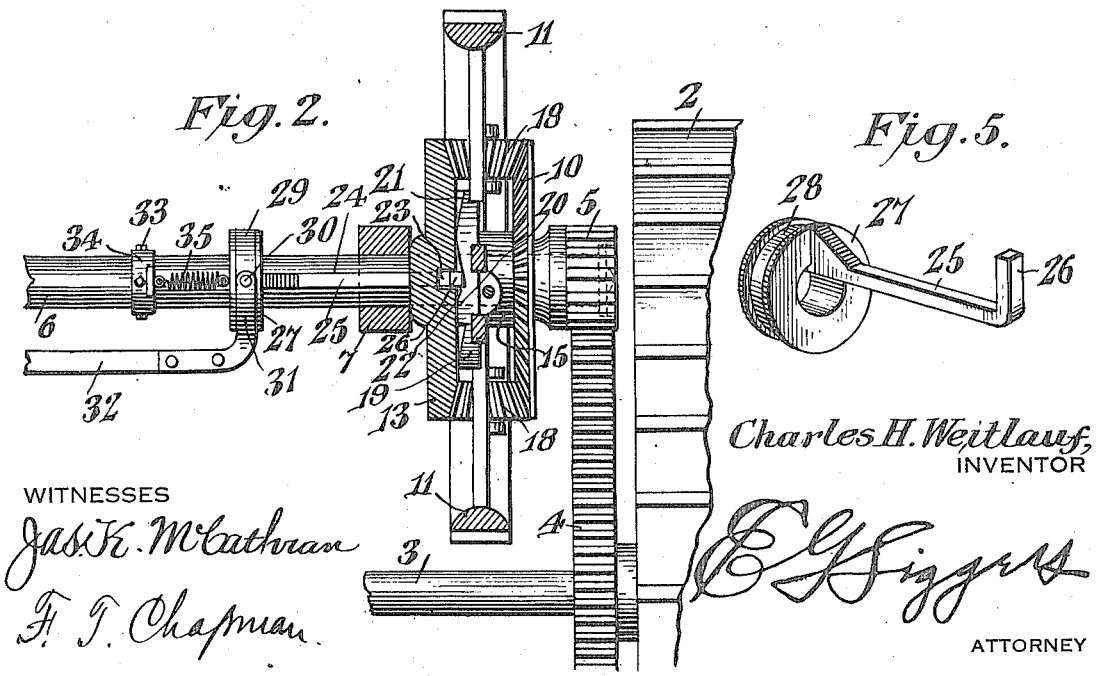

CHARLES H. WEITLAUF, OF PADUCAH, KENTUCKY.

DIFFERENTIAL GEARING FOR TRACTION-ENGINES.

1,148,418.  Specification of Letters Patent.  Patented July 27, 1915.

Application filed April 4, 1914. Serial No. 829,642.

*To all whom it may concern:*

Be it known that I, CHARLES H. WEITLAUF, a citizen of the United States, residing at Paducah, in the county of McCracken and State of Kentucky, have invented a new and useful Differential Gearing for Traction-Engines, of which the following is a specification.

This invention has reference to improvements in differential gearing for traction engines, although not of necessity limited to such particular type of vehicle, and its object is to prevent stalling of a vehicle equipped with differential gearing when for any reason one of the wheels may become mired and slip.

The traction engines are often equipped with differential gearing to facilitate the turning of corners, but should it happen that one of the wheels runs upon slippery ground, such as a miry place, the wheel may rotate without sufficient tractive effect to drive the vehicle, in which case the differential gearing permits such idle rotation while the other wheel stands still and the consequence is that it is then impossible to propel the vehicle.

In accordance with the present invention there is provided a locking mechanism for the differential gearing, which locking mechanism is under the control of the operator of the vehicle, so that should the vehicle rest upon such character of ground as to cause slipping of one of the wheels without progressive movement of the vehicle, the two parts of the differential gearing may be so locked together that the differential feature is then eliminated and both wheels are rotated simultaneously by the driving power, thus causing the wheel which at the time is upon solid ground to propel the vehicle and thereby carry the other wheel out of the miry or otherwise slippery place until the road conditions are such as to permit the unlocking of the two parts of the differential gearing so that it may act in the customary manner.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a view partly in elevation and partly in section of the improved differential gearing and such parts of a traction engine as are needed for an understanding of the invention. Fig. 2 is a plan view partly in horizontal section of a portion of the structure shown in Fig. 1. Fig. 3 is a face view of a gear wheel constituting a part of the differential gearing as modified in accordance with the present invention. Fig. 4 is a fragmentary section on the line 4—4 of Fig. 3 but drawn on a larger scale. Fig. 5 is a perspective view of a lock member constituting a part of the present invention.

Referring to the drawings there is shown in Fig. 1 a portion of a boiler 1 of a traction engine, and in Figs. 1 and 2 a portion of one of the traction wheels 2, the latter being mounted upon an axle 3 as shown in Fig. 2, and upon the axle is a gear wheel 4 with which meshes a pinion 5 upon the corresponding end of a shaft 6, the latter being mounted in bearings 7 at the ends of a supporting frame 8 made fast to the under side of the boiler 1 by brackets 9 or otherwise. It will be understood that there are two traction wheels 2, and two gear wheels 4, while two pinions 5 are shown in Fig. 1, each pinion driving a respective traction wheel 2. The pinion 5 at one end of the shaft 6 is made fast thereto and in the particular showing of the drawings the pinion 5 made fast to the shaft 6 is that at the left hand end of such shaft as viewed in Fig. 1. The other pinion 5 is free to rotate upon the shaft 6 independently of the shaft, and is made fast to or formed on a bevel gear wheel 10 likewise rotatable upon the shaft 6.

Mounted on the shaft 6 adjacent to the gear wheel 10 is a gear wheel 11 with which there meshes an idler gear wheel 12 assumed to be in turn connected to the power element of the traction engine for rotation thereby in a customary manner, for which reason the power element is not illustrated in the drawings. Mounted on the shaft 6 on the side of the gear wheel 11 remote from the gear wheel 10 is another bevel gear 13 made fast to the shaft 6 in any suitable manner, as by a key 14, so that the bevel gear 13 and shaft 6 turn together.

The gear wheel 11 is provided with a hub 15 of an axial extent to form an abutment for the gear wheel 10, and this gear wheel, as well as the pinion 5 fast to it, is held on the shaft 6 against longitudinal movement therealong by any suitable means simply indicated in the drawing as a plate 16 and screw 17, but it will be understood that any other suitable means for the purpose may be employed. The gear wheel 11 carries a suitable number of bevel pinions 18 arranged to mesh with the gear wheels 10 and 13, the arrangement being that commonly employed in differential gearing.

So far the structure described may be such as is commonly employed in traction engines, and the differential gearing may correspond in general form to that customarily employed in traction engines where such gearing is provided.

In the application of the present invention to the differential gearing the gear wheel 11 between the series of bevel pinions 18 and the hub of the wheel has a face portion 19 toward the gear wheel 13, and this face portion is provided with a circular series of segmental plateaus 20 separated by doubly inclined intermediate spaces 21, the portion 19 being thinned toward the plateaus 20 to form shoulders 22 on opposite sides of the plateaus, these shoulders being parallel to corresponding radii of the wheel and the shoulders of a plateau being parallel to extensions of the opposite shoulders of the diametrically opposite plateau.

That face of the gear wheel 13 toward the portion 19 of the gear wheel 11 is formed with a radial recess 23 and the shaft 6 is provided with a longitudinal key way 24 into which the recess 23 opens at its inner end. Lodged in the key way 24 is a longitudinally extended bar 25 having an angular end 26, the bar 25 being adapted to the key way 24 and the angular end 26 seating in the radial recess 23. At that end of the bar remote from the angular end 26 it is attached to or made integral with a ring 27 surrounding and capable of moving longitudinally of the shaft 6, and this ring is formed with an exterior annular groove 28 in which is seated a ring 29 having trunnions 30 on opposite sides of which is pivoted a fork 31 on one end of an operating bar or rod 32 which it will be understood is arranged for manipulation by the operator of the vehicle, so that the ring 28, together with the bar 25 may be moved longitudinally of the shaft 6 as the operator wills.

Made fast to the shaft 6 by set screws 33 or otherwise, is a collar 34 spaced a suitable distance from the ring 27 and connected to the ring 27 by springs 35 having a normal tendency to maintain the ring 27 in a position approaching the collar 34 to an extent completely seating the angle extension 26 of the bar 25 in the recess 23 and out of the path of the shoulders 22 on the gear wheel 11. On a suitable manipulation of the rod 32 the ring 27 is moved against the action of the springs 35 toward the gear wheel 13 until the end 26 rides down one of the inclines of the intermediate parts 21 of the face member 19 into engagement with a shoulder 22, when the gear 13 is locked to the gear 11 and the parts turn together. Under these circumstances the gear wheel 11 is locked to the shaft 6 and since the gear wheel 13 is already fast thereto there can be no difference of motion between the gear wheels 11 and 13, and consequently the pinions 18 cannot rotate and the gear wheel 10 and corresponding pinion 5 must of necessity rotate with the gear wheels 11 and 13 and the shaft 6, wherefore both traction wheels are positively driven by the power element at the same rate of speed and slipping of one of the traction wheels can have no effect upon the other. Under these circumstances if either one of the traction wheels has a driving grip upon the ground over which the engine is traveling, the engine is driven progressively even though the other wheel has no driving hold upon the ground. So long as the operator maintains the angle or block extension 26 of the bar 25 against a shoulder 22 the differential gearing is inactive as differential gearing. As soon, however, as the force holding the ring 27 in the locking position is moved, the springs 35 return the ring 27 to its first position withdrawing the angle extension 26 into the recess 23 where it remains out of the path of the face portion 19 of the gear wheel 11 and the differential gearing operates in the customary way. The bar 25 is seated in the groove or key-way 24 to a sufficient depth so as not to interfere in any way with the bearing 7 through which it is extended.

The width of the locking angle extension 26 in the direction of the length of the bar 25 and the depth of the shoulders 22 and recess 23 are all such that when the locking angle extension 26 is in engagement with a shoulder 22 it is also in part seated within the recess 23 and this angle extension being radial to the gear wheels 13 and 11 forms a lock effectively resistant to the heavy forces exerted upon the traction engine in driving it, especially when it may be pulling a heavy load.

What is claimed is:—

1. In a traction engine, differential gearing provided with a driving or master gear wheel having a plurality of locking means in circular series thereon, a driving shaft upon which the differential gearing is mounted, and a substantially radial locking member mounted on the drive shaft for movement longitudinally thereof to carry said locking member into and out of engagement with any one of the locking means on the master wheel, the differential gearing including a member fast to the shaft and provided with a radial recess for lodging the radial locking member, and said member of the differential gearing constituting a stop for the retractive movement of said radial locking member.

2. In a traction engine, the combination with a shaft, of a member mounted on the shaft for rotation thereon and provided with a hub having a face portion formed into a circular series of segmental plateaus separated by doubly inclined intermediate spaces terminating at opposite sides of the plateaus in shoulders, and a substantially radial locking member mounted on and slidable longitudinally of the shaft into and out of the path of the shoulders for connecting the shaft with and disconnecting it from the member carrying the locking shoulders.

3. In a traction engine, a shaft having at one end a pinion fast thereto and at the other end a pinion mounted for rotation thereon, the pinion loose upon the shaft having a gear wheel fast thereto, another gear wheel mounted on the shaft adjacent to the last-named gear wheel, a third gear wheel secured to the shaft on the side of the second-named gear wheel remote from the first-named gear wheel, the second-named gear wheel, the second-named gear wheel carrying pinions in mesh with the gear wheels on opposite sides of it and also provided on one side with a face portion having a circular series of shoulders formed thereon, and the shaft being provided with a lengthwise key-way or groove, a bar mounted in the key-way for lengthwise movement therein and terminating between the second and third-named gear wheels in an angle extension adapted to engage a shoulder on the second-named gear wheel, and the third-named gear wheel being recessed for the reception of the angle extension, and means for longitudinal movement of the bar.

4. In a traction engine, a shaft having at one end a pinion fast thereto and at the other end a pinion mounted for rotation thereon, the pinion loose upon the shaft having a gear wheel fast thereto, another gear wheel mounted on the shaft adjacent to the last-named gear wheel, a third gear wheel secured to the shaft on the side of the second-named gear wheel remote from the first-named gear wheel, the second named gear wheel carrying pinions in mesh with the gear wheels on opposite sides of it and also provided on one side with a face portion having a circular series of shoulders formed thereon and the shaft being provided with a lengthwise key-way or groove, a bar mounted in the key-way for lengthwise movement therein and terminating between the second and third-named gear wheels in an angle extension adapted to engage a shoulder on the second-named gear wheel, and the third-named gear wheel being recessed for the reception of the angle extension, and means for longitudinal movement of the bar, the angle extension, shoulders and recess being proportioned to maintain the angle extension in the recess when in engagement with a shoulder.

5. In a traction engine, a shaft having at one end a pinion fast thereto and at the other end a pinion mounted for rotation thereon, the pinion loose upon the shaft having a gear wheel fast thereto, another gear wheel mounted on the shaft adjacent to the last-named gear wheel, a third gear wheel secured to the shaft on the side of the second-named gear wheel remote from the first-named gear wheel, the second-named gear wheel carrying pinions in mesh with the gear wheels on opposite sides of it and also provided on one side with a face portion having a circular series of shoulders formed thereon and the shaft being provided with a lengthwise key-way or groove, a bar mounted in the key-way for lengthwise movement therein and terminating between the second and third-named gear wheels in an angle extension adapted to engage a shoulder on the second-named gear wheel, and the third-named gear wheel being recessed for the reception of the angle extension, and means for longitudinal movement of the bar, the angle extension, shoulders and recess being proportioned to maintain the angle extension in the recess when in engagement with a shoulder, and the means for moving the bar longitudinally comprising a ring member fast to the end of the bar remote from the angle extension and mounted to slide on the shaft, a collar fast to the shaft, springs between the collar and ring member, and operating means for the ring member engaging the latter.

6. In a differential gear mechanism for traction engines, a gear wheel provided with a hub having at one end a face portion provided with a circular series of segmental plateaus separated by doubly inclined intermediate spaces terminating at opposite sides of the plateaus in shoulders parallel to corresponding radii of the wheel and with the shoulders of each plateau parallel to extensions of the opposite shoulder of the diametrically opposite plateau, another gear wheel forming part of the differential gearing and facing the shouldered portions of the first-named gear wheel and there provided with a radial recess, and a radial locking member normally seated in the radial recess and movable toward and from the shouldered portion of the first-named gear wheel into and out of engagement with any one of the shoulders.

7. In a differential gear mechanism for traction engines, a shaft having means at opposite ends for driving the wheels of the engine, differential gearing mounted on the shaft with one member fast to one of the means for driving the traction wheels and including a driving gear wheel mounted for rotation on the shaft and another gear wheel alongside of the driving gear wheel and fast to the shaft, said shaft having a longitudinal groove or key-way extending through the last-named gear wheel, and said last-named gear wheel having a radial recess therein opening into the key-way, and a bar mounted in the key-way and provided with an angle extension adapted to the radial recess in the said gear wheel provided with such recess, the driving gear wheel mounted for rotation on the shaft having a hub portion provided with a circular series of shoulders in position to be engaged by the angle extension of the bar when moved in a direction away from the recess in which it is normally seated.

In testimony, that I claim the foregoing as my own I have hereto affixed my signature in the presence of two witnesses.

CHAS. H. WEITLAUF.

Witnesses:
FRANK TROUTMAN,
ARTHUR GISH.